United States Patent
Cohen et al.

(10) Patent No.: US 11,749,274 B2
(45) Date of Patent: *Sep. 5, 2023

(54) INFERENCE ON DATE TIME CONSTRAINT EXPRESSIONS

(71) Applicant: Microsoft Technology Licensing, LLC, Redmond, WA (US)

(72) Inventors: Jordan Rian Cohen, Kure Beach, NC (US); David Leo Wright Hall, Berkeley, CA (US); Jason Andrew Wolfe, San Francisco, CA (US); Daniel Lawrence Roth, Newton, MA (US); Daniel Klein, Orinda, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/247,130

(22) Filed: Dec. 1, 2020

(65) Prior Publication Data

US 2021/0118444 A1    Apr. 22, 2021

Related U.S. Application Data

(63) Continuation of application No. 16/035,346, filed on Jul. 13, 2018, now Pat. No. 10,861,455.

(Continued)

(51) Int. Cl.
*G10L 15/26* (2006.01)
*G10L 15/22* (2006.01)
(Continued)

(52) U.S. Cl.
CPC ............ *G10L 15/22* (2013.01); *G06F 16/908* (2019.01); *G06F 16/90332* (2019.01);
(Continued)

(58) Field of Classification Search
CPC ....... G10L 15/26; G10L 15/22; G10L 15/063; G10L 15/1822; G10L 15/00; G10L 15/18; G10L 15/08; G06F 40/30; G06F 16/9033
See application file for complete search history.

(56) References Cited

U.S. PATENT DOCUMENTS

| | | | | |
|---|---|---|---|---|
| 6,108,640 A | * | 8/2000 | Slotznick | G06Q 20/102 705/40 |
| 6,701,294 B1 | * | 3/2004 | Ball | G06F 16/2423 704/9 |

(Continued)

*Primary Examiner* — Jakieda R Jackson
(74) *Attorney, Agent, or Firm* — Alleman Hall Creasman & Tuttle LLP

(57) ABSTRACT

A method includes receiving an utterance at a computerized automated assistant system, and detecting, via a date/time constraint module of the computerized automated assistant system, one or more constraints in the utterance associated with a date or time. The utterance is associated with a domain. The method further comprises generating, via the date/time constraint module, a periodic set for each of the one or more constraints associated with the date or time, and combining, via the date/time constraint module, the one or more periodic sets. The method further comprises processing, via a dialogue manager module of the computerized automated assistant system, the combined periodic sets to determine an action, and executing the action at the computerized automated assistant system.

20 Claims, 11 Drawing Sheets

Related U.S. Application Data

(60) Provisional application No. 62/532,300, filed on Jul. 13, 2017.

(51) Int. Cl.

| | | |
|---|---|---|
| *G06F 16/908* | (2019.01) | |
| *G06N 20/00* | (2019.01) | |
| *G10L 15/18* | (2013.01) | |
| *G06F 16/9032* | (2019.01) | |
| *G06F 40/35* | (2020.01) | |
| *G06F 40/279* | (2020.01) | |
| *G06N 5/01* | (2023.01) | |
| *G06N 3/006* | (2023.01) | |
| *G06N 3/044* | (2023.01) | |
| *G06N 3/045* | (2023.01) | |
| *G06N 3/047* | (2023.01) | |
| *G06N 7/01* | (2023.01) | |

(52) U.S. Cl.
CPC ............ *G06F 40/279* (2020.01); *G06F 40/35* (2020.01); *G06N 5/01* (2023.01); *G06N 20/00* (2019.01); *G10L 15/1822* (2013.01); *G10L 15/26* (2013.01); *G06N 3/006* (2013.01); *G06N 3/044* (2023.01); *G06N 3/045* (2023.01); *G06N 3/047* (2023.01); *G06N 7/01* (2023.01); *G10L 2015/223* (2013.01)

(56) References Cited

U.S. PATENT DOCUMENTS

| | | | | |
|---|---|---|---|---|
| 8,140,402 | B1* | 3/2012 | Mesaros | G06Q 30/0601 705/26.1 |
| 8,577,671 | B1* | 11/2013 | Barve | G06F 16/24573 715/752 |
| 2006/0233325 | A1* | 10/2006 | Wu | G06F 40/242 704/E15.045 |
| 2007/0033025 | A1* | 2/2007 | Helbing | G10L 15/08 704/231 |
| 2007/0208570 | A1* | 9/2007 | Bhardwaj | G06F 16/3331 704/270.1 |
| 2007/0288239 | A1* | 12/2007 | Russell | G10L 15/193 704/E15.044 |
| 2008/0091406 | A1* | 4/2008 | Baldwin | G06F 3/167 704/4 |
| 2008/0215614 | A1* | 9/2008 | Slattery | G06F 16/217 |
| 2008/0256099 | A1* | 10/2008 | Chodorov | G06Q 10/10 |
| 2011/0166860 | A1* | 7/2011 | Tran | H04M 3/4938 704/E15.005 |
| 2013/0018849 | A1* | 1/2013 | Johnston | G06F 16/219 707/687 |
| 2013/0091139 | A1* | 4/2013 | Raj | G06F 40/30 707/740 |
| 2014/0156642 | A1* | 6/2014 | Johnson | G06F 16/245 707/736 |
| 2014/0354442 | A1* | 12/2014 | Maity | G08B 27/005 340/691.6 |
| 2015/0149203 | A1* | 5/2015 | Csurka | G06Q 10/1095 705/3 |
| 2015/0169667 | A1* | 6/2015 | Roth | G06F 16/83 707/691 |
| 2016/0253187 | A1* | 9/2016 | Kim | G06F 1/329 719/320 |
| 2016/0314165 | A1* | 10/2016 | Roth | G06F 16/25 |
| 2018/0261216 | A1* | 9/2018 | Leeb | G10L 15/02 |

\* cited by examiner

INFERENCE ON DATE TIME CONSTRAINT EXPRESSIONS

CROSS REFERENCE TO RELATED APPLICATIONS

The present application is a continuation from U.S. patent application Ser. No. 16/035,346, filed Jul. 13, 2018, which claims the priority benefit of U.S. Provisional Patent Application Ser. No. 62/532,300, filed on Jul. 13, 2017, titled "Inference on Constraint Expressions," the disclosures of each of which is hereby incorporated herein by reference for all purposes.

BACKGROUND

An automated assistant may converse with a user about various domains of knowledge. Previous command/control systems that facilitate user interaction through spoken dialogue, such as SIRI™ or ALEXA™, often fail to provide the answer that the user was looking for. Part of the problem is a failure to correctly understand and process requests having vague date and time constraints, such as for example, "I need a flight next week in the afternoon."

SUMMARY

Examples are disclosed that relate to an automated assistant. One example provides a method comprising receiving an utterance at a computerized automated assistant system, and detecting, via a date/time constraint module of the computerized automated assistant system, one or more constraints in the utterance associated with a date or time. The utterance is associated with a domain, and the computerized automated assistant system includes one or more computing machines. The method further comprises generating, via the date/time constraint module, a periodic set for each of the one or more constraints associated with the date or time, and combining, via the date/time constraint module, the one or more periodic sets. The method further comprises processing, via a dialogue manager module of the computerized automated assistant system, the combined periodic sets to determine an action, and executing the action at the computerized automated assistant system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A computerized automated assistant enables users to interact with a computing device through the familiar and intuitive paradigm of conversation. While conversations carried out with an automated assistant may pertain to a wide variety of domains (e.g., topics, subjects), one common topic is that of travel. In this context, a user may converse with an automated assistant to establish an itinerary for a future trip, specifying dates of departure and arrival, for example. Although the automated assistant may understand the general intent to plan a trip, issues may arise when attempting to understand specific date and time constraints, particularly when phrased in vague terms. As an example, the automated assistant may not fully understand the date/time constraints associated with a user utterance in the form of "I need a flight next week in the afternoon." This lack of understanding may force a user to provide additional input, potentially degrading the user experience and dissuading the user from future use of the automated assistant, and causing the expenditure of additional computing resources (e.g., processing, storage, bandwidth resources) to achieve full understanding of the constraints. The same problems exist in other contexts that have temporal constraints.

Accordingly, examples are disclosed that relate to understanding temporal constraints specified in user utterances and other queries at an automated assistant and other similarly configured devices. As described below, the enhanced understanding of temporal constraints may be facilitated at least in part by (1) identifying atomic elements of a temporal constraint (e.g., those elements that in and of themselves cannot be simplified into simpler, constituent elements); (2) converting the atomic elements to specific mathematical structures that exhibit periodicity; and (3) combining the periodic structures via specific mathematical operations including operations found in set mathematics. In addition to enabling greater understanding of temporal constraints specified in user queries—and accordingly reducing the expenditure of computational resources—the approaches described herein may facilitate the understanding of equivalence among different sets of temporal constraints, and additional, derived temporal constraints and other corollaries to be inferred from temporal constraints specified in user queries. By understanding equivalence, an automated assistant may simplify temporal constraints, allowing constraint processing with reduced computational resources as compared to the processing of unsimplified constraints, while inference may allow the automated assistant to provide suggestions in accordance with user requests.

Figure 1:
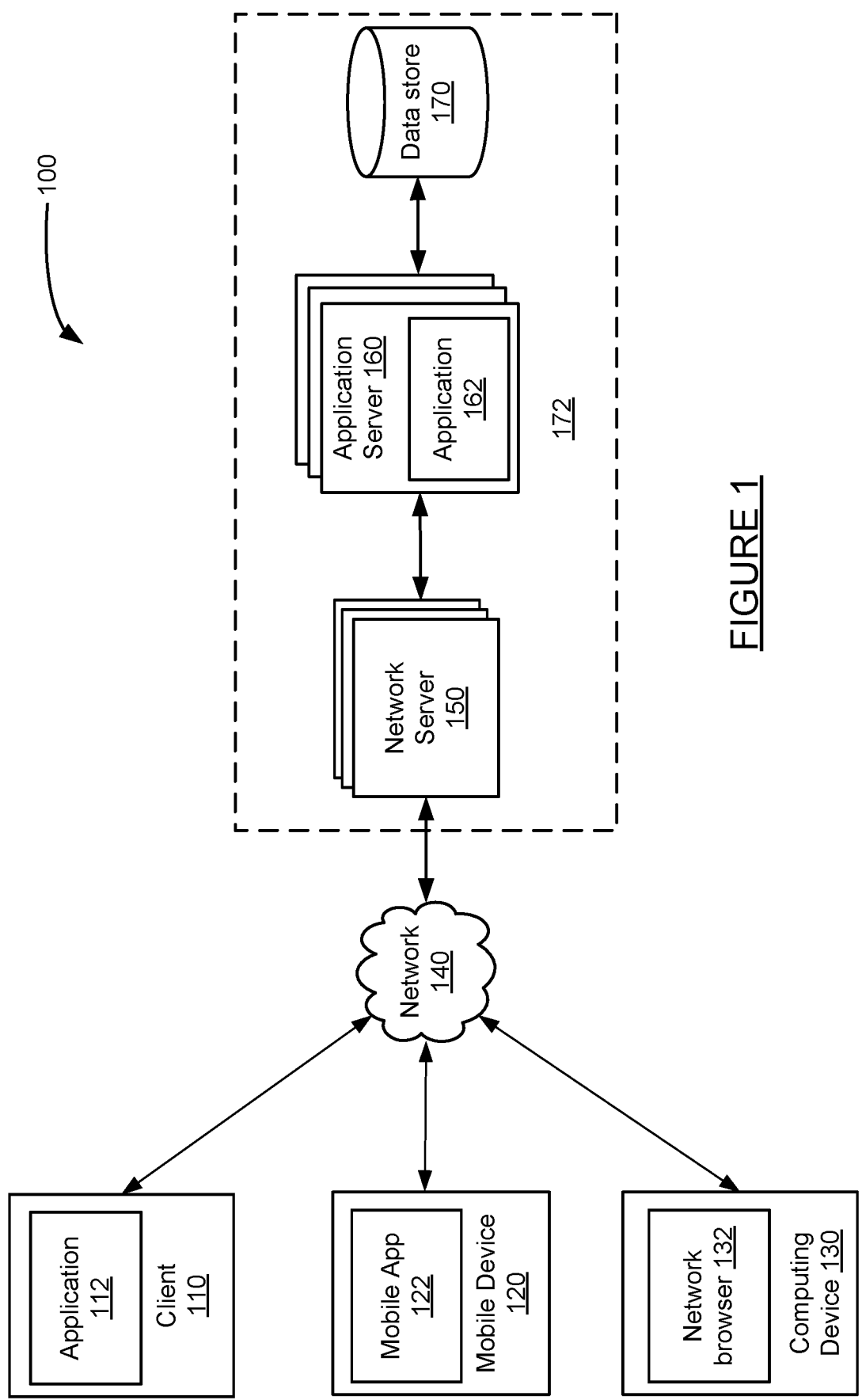
FIG. 1 is a block diagram of an example computing system for providing an automated assistant.

FIG. 1 is a block diagram of an example computerized automated assistant system 100 for providing an automated assistant. System 100 of FIG. 1 includes client 110, mobile device 120, computing device 130, network 140, network server 150, application server 160, and data store 170. Client 110, mobile device 120, and computing device 130 communicate with network server 150 over network 140. Network 140 may include a private network, public network, the Internet, an intranet, a WAN, a LAN, a cellular network, and/or any other network suitable for the transmission of data among computing devices of FIG. 1.

Client 110 includes application 112. Application 112 may provide an automated assistant, text-to-speech (TTS) functionality, automatic speech recognition, parsing (e.g., of user utterances), domain detection (e.g., detecting a topic/subject invoked by a user utterance), and/or other functionality discussed herein. Application 112 may be implemented as one or more applications, objects, modules, and/or other software and/or instantiated logic. Application 112 may communicate with application server 160 and data store 170 through network server 150 or directly (not illustrated in FIG. 1) to access data.

Mobile device 120 may include a mobile application 122. The mobile application may provide at least a portion of the functionality described with respect to application 112. Mobile application 122 may be implemented as one or more applications, objects, modules, and/or other software or instantiated logic, and may operate to provide services in conjunction with application server 160.

Computing device 130 may include a network browser 132. The network browser may receive one or more content pages, script code, and other code that when loaded into the network browser implement at least a portion of the functionality described with respect to application 112. The content pages may operate to provide services in conjunction with application server 160. Network browser 132 may be implemented as one or more applications, objects, modules, and/or other software or instantiated logic, and may operate to provide services in conjunction with application server 160.

Network server 150 may receive requests and data from application 112, mobile application 122, and network browser 132 via network 140. Requests may be initiated by the particular applications or browser applications. Network server 150 may process the request and data, transmit a response, or transmit the request and data or other content to application server 160.

Application server 160 includes application 162. The application server may receive data, including data requests received from applications 112 and 122 and browser 132, process the data, and transmit a response to network server 150. In some implementations, the network server 150 forwards responses to the computer/application/browser that originally sent the request. Application server 160 may also communicate with data store 170. For example, data can be accessed from data store 170 to be used by an application to provide the functionality described with respect to application 112. Application server 160 includes application 162, which may operate similar to application 112 except implemented all or in part on application server 160. Application 162 may be implemented as one or more applications, objects, modules, and/or other software or instantiated logic, and may operate to provide services in conjunction with one or more of client 110, mobile device 120, and computing device 130.

Block 172 includes network server 150, application server 160, and data store 170, and may be used to implement an automated assistant that includes a domain detection mechanism. Modules that may be used to implement an automated assistant are described with respect to FIG. 2. In some implementations, some to all of the functionality described with respect to block 172 may be incorporated into client 110, mobile device 120, and/or computing device 130.

Figure 2:
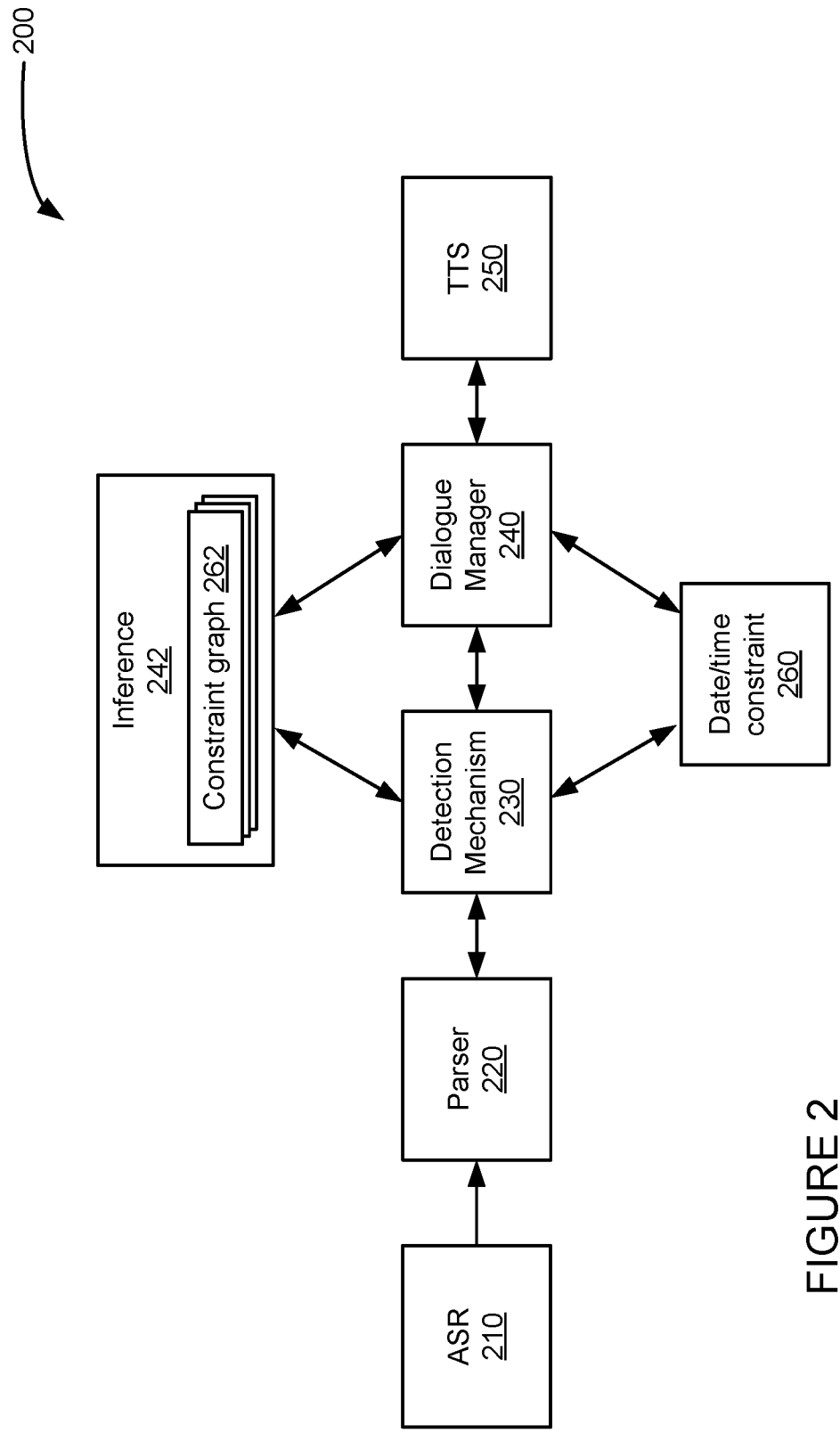
FIG. 2 is a block diagram of example modules that implement an automated assistant.

FIG. 2 is a block diagram of example modules that may be used to implement an automated assistant 200. Application 112 of client 110, mobile application 112 of mobile device 120, network browser 132 of computing device 130, and/or application 162 of server 160 (generally, computerized automated assistant system 100) may implement one or more of the modules of automated assistant 200, for example. In some examples, the modules of automated assistant 200 may be implemented as software executed on suitable computer hardware (e.g., including one or more of a suitable logic device such as a processor, input device(s), output device(s), memory) or as instantiated logic.

Varying portions of automated assistant 200 may be implemented locally and/or remotely—for example, an automated assistant may be entirely implemented on hardware that is local to a user. In other examples, a portion of an automated assistant may be implemented on local hardware, while another portion of the automated assistant is implemented on remote hardware (e.g., on a cloud computing service communicatively coupled to the local hardware)—e.g., the local portion of the assistant may perform speech recognition and parsing of user utterances recorded locally, and perform text-to-speech conversion for replies to the user, while the remote portion of the assistant may determine actions congruent with the user utterances (as described below). As another example, a remote portion of an automated assistant may perform substantially all functions associated with user utterance processing and reply generation, while local hardware may record user utterances and output replies. Generally, automated assistant 200 may be distributed locally and/or remotely in any suitable manner.

Automated assistant 200 may facilitate cooperative planning and execution of travel with a user, among many other human-assistant cooperative operations based on a conversational interface. In some examples, automated assistant 200 may be implemented in accordance with a data flow system design paradigm. In a typical data flow system, a computational element (e.g., software or instantiated logic) is described as having inputs and outputs, and the system asynchronously computes the output(s) whenever the inputs are available.

As an example, if a user asks automated assistant 200 for a round-trip airline ticket between two cities, the computing element for that ticket function has inputs for the date(s) of travel and the cities involved. Additionally, it has optional elements for the class of service, the number of stopovers, the maximum cost, the lengths of the flights, the time of day for each flight, and/or other potential optional elements.

Automated assistant 200 may check to see if optional elements have been received. It can initiate a conversation with the user to inquire about optional elements, and set them if the user requests. Finally, if sufficient elements for the flight are set, then automated assistant 200 looks up the appropriate flights, and picks the best one to present to the user via one or more output devices included in or communicatively coupled to the automated assistant (e.g., one or more speakers, a display device). Automated assistant 200 may then ask the user if it should book that flight.

If optional elements have not been specified, automated assistant 200 may prompt the user if he/she would like to set any of the optional elements, and if the user responds positively the assistant may engage in a dialogue (e.g., via a dialogue manger module described below) to elicit any optional requirements that the user wants to impose on the trip. Optional elements may be hard requirements (a particular date, for instance) or soft requirements (a preferred flight time or flight length). At the end of the optional element interchange, automated assistant 200 then looks up an appropriate flight, outputs it to the user, and asks the user whether it should book that flight.

The automated assistant of FIG. 2 includes automatic speech recognition (ASR) module 210, semantic parser module 220, detection mechanism module 230, dialogue manager module 240, inference module 242, and TTS module 250. As discussed below with reference to FIG. 11, the modules may be instantiated as machines with cooperating computer hardware, and the modules may utilize machine learning and/or artificial intelligence to provide the functionality described herein. ASR module 210 receives audio content, such as content received through a microphone from one of client 110, mobile device 120, or computing device 130, and may process the audio content to recognize speech. The ASR module can output recognized speech as text to parser 220. In some example, ASR module 210 may be trained via any suitable collection of machine learning and/or artificial intelligence techniques, in which case the ASR module may be referred to as a "machine-learning trained" speech recognition module.

Parser 220 receives a speech utterance (e.g., text), which includes one or more words, and can interpret the user utterance into intentions. Parser 220 may generate one or more plans, for example by creating one or more cards, using a current dialogue state received from elsewhere in the automated assistant (e.g., dialogue manager). For example, parser 220, as a result of performing a parsing operation on the utterance, may generate one or more plans that may include performing one or more actions or tasks. In some instances, a plan may include generating one or more cards within a system. In another example, the action plan may include generating number of steps by a system such as that described in U.S. patent application No. 62/462,736, filed Feb. 23, 2017, entitled "Expandable Dialogue System," the disclosure of which is hereby incorporated herein by reference in its entirety.

In some examples, a "plan" specifies a transition from a first dialogue state to a second dialogue state that is a modification of the first dialogue state. Modifications may include the addition of cards to a graph, replacement of a card with another card, or rearrangement of existing cards in a graph. Further, a plan may specify one or actions associated with the transition, generally with the new state of the plan designating that those actions have been performed.

In some examples, the maintenance of a dialogue state may be specified in terms of a "card". A card may have an output of a predefined type, and a number of fields each of a predefined type. Values of these fields may be considered as inputs that define the output of the card.

In some examples, semantic parser 220 may create information for dialogue manager module 240. In these examples, semantic parser 220 may use information about past usage as a primary source of information, combining the past use information with automated assistant actions and outputs, allowing each collection of words/phrases (e.g., uttered by a user interacting with the automated assistant and/or words/phrases in a reply generated by the automated assistant) to be described by its contribution to the automated assistant actions. This results in creating a semantic description of the word/phrases.

Parser module 220 may report words used in any utterance, and may report one or more words not used in an utterance but that could have been used (based on an analysis identifying one or more words available for use) because they did not satisfy a threshold. An accounting of word(s) not used may be helpful in later analysis of exchanges between a user and the automated assistant, where some exchanges may be converted to words or phrases in that particular context that have an assigned semantic label.

Detection mechanism 230 may receive a plan and a coverage vector generated by parser 220, detect unparsed words that are likely to be important in an utterance, and modify the plan based on important unparsed words. Detection mechanism 230 may include a classifier that classifies each unparsed word as important or not important based on one or more features. For each important word, a determination may be made as to whether a score for the important word achieves a threshold. In some instances, any word or phrase candidate which is not already parsed is analyzed by reference to its past statistical occurrences, and a determination is made whether or not to pay attention to that word/phrase. If the score for an important unparsed word reaches the threshold, the modified plan may include generating a message that the important unparsed word or some action associated with the unparsed word cannot be handled or performed by the automated assistant.

In some instances, a single phrase maximizing a "phraseScore" function can be identified, or a Semi-Markov dynamic program can be run to search for the maximum assignment of phrases to the phraseScore function. If used, the dynamic program may satisfy the following recurrence: score[j]=max(score[j−1], max_{i<j}(score(i)+phraseScore(i, j)*all(elegible{i:j}))

The phrase can be returned with the highest score that exceeds some threshold (set for desired sensitivity). In some instances, a phraseScore is any computable function of the dialogue state and the input utterance. In some instances, the phraseScore is a machine learnable function, estimated with an Artificial Neural Network and/or a statistical model.

Dialogue manager module 240 may perform actions based on a plan and context received from detection mechanism module 230 and/or parser module 220 and generate a response based on the actions performed and any responses received, for example from external services and entities. A response generated by dialogue manager module 240 may be output to TTS module 250. TTS module 250 may receive the response, generate speech based on the received response (e.g., speech that vocalizes the response), and output the speech to a device associated with a user, such as one or more speakers proximate to the user. The speaker(s) may be included in the automated assistant (e.g., disposed in a common housing along with other computer hardware implementing the automated assistant) or otherwise communicatively coupled to the automated assistant.

Inference module 242 can be used to search databases and interact with users. Inference module 242 may include one or more per-domain-type sub-solvers and, for each domain, a corresponding constraint graph (e.g., constraint graph 262) appropriate for that domain. In some examples, an automated assistant may implement a general purpose engine that uses a combination of its own inference mechanisms and the sub-solvers. The general purpose engine may be a constraint satisfaction problem (CSP) solver module or a weighted variant thereof, for example. In this context, solvers may include resolvers, constraints, preferences, or domain-specific modules such as one that reasons about constraints on dates, times, and/or numbers. Solvers may respond with either results or with a message about the validity of certain constraints, or with information about which constraints facilitate its functioning.

Date/time constraint module 260 analyzes and processes date/time portions of a user utterance. Once the date/time portions are detected, the date/time constraint module 260 can generate periodic sets (e.g., data exhibiting periodicity), combine periodic sets using connectives (e.g., set operations such as union and intersection), and confirm the combined sets comply with constraints. Module 260 may generate periodic sets based on user speech that is processed in various manners—e.g., recognized, parsed, and/or labeled.

Additional details for an automated assistant such as that of FIG. 2 are described in additional detail in U.S. patent application Ser. No. 15/792,236, filed Oct. 24, 2017, entitled "Sequence to Sequence Transformations for Speech Synthesis Via Recurrent Neural Networks," the disclosure of which is hereby incorporated herein by reference in its entirety.

Figure 3:
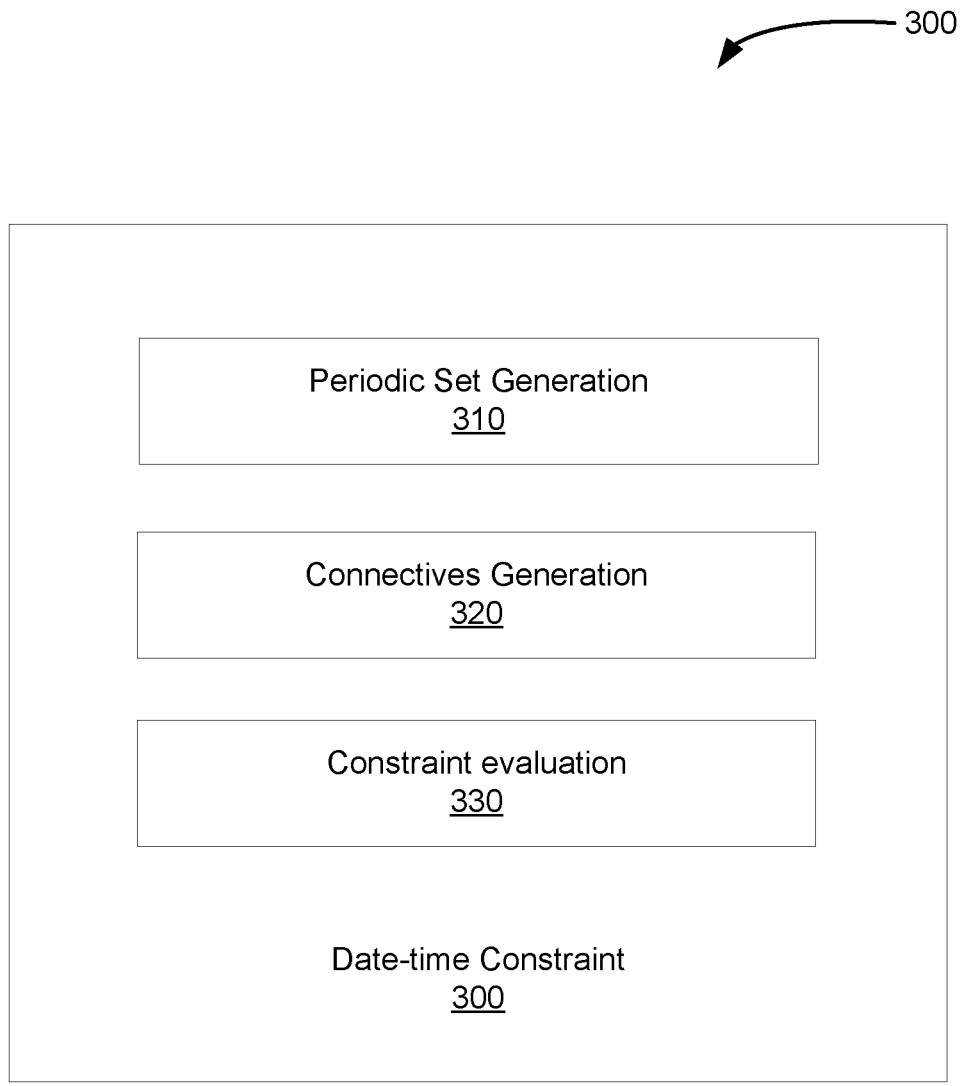
FIG. 3 provides a block diagram of an example date/time constraint module.

FIG. 3 provides a block diagram of an example date/time constraint module 300. Module 300 may be date/time constraint module 260 of FIG. 2, for example. Date/time constraint module 300 of FIG. 3 includes periodic set generation module 310, connectives generation module 320, and constraint evaluation module 330. Periodic set generation module 310 generates periodic sets from utterances provided by a user. The periodic sets may be analyzed, processed with connectives, and/or have constraints applied to them to determine date and time information. Additional detail regarding the generation of periodic sets is described below.

Connectives generation module 320 generates connectives between periodic sets generated by module 310. The connectives may include one or both of 'AND' and 'OR'. 'AND' may refer to an intersection function, such as the intersection operation in set mathematics, and 'OR' may refer to a union function, such as the union operation in set mathematics, as examples. Constraint evaluation 330 module may determine if a user request complies with explicit user constraints, inherent system constraints, and other constraints used to select actions to perform on behalf of a user. As described above with reference to inference module 242, connectives in some examples generation module 320 may leverage a general purpose engine that uses a combination of its own inference mechanisms and the sub-solvers. The general purpose engine may be a CSP solver module or a weighted variant thereof, for example. In this context, solvers may include resolvers, constraints, preferences, or domain-specific modules such as one that reasons about constraints on dates, times, and/or numbers.

To illustrate how temporal constraints specified in user utterances directed at an automated assistant may be processed by one or more of the modules described herein, various examples follow in which atomic elements are derived from temporal constraints and associated with periodic data structures, and set operations are performed using the periodic data structures. In particular, one or more of modules 210, 220, 230, 240, 242, 250, 260, 300, 310, 320, and 330 instantiated via one or more computers, and/or computerized automated assistant system 100, may be used to carry out the processing described in these examples.

Expression trees of date/time constraints can be translated into a compact, efficient representation referred to herein as an "OrderedSet". This representation explicitly describes the (potentially infinite) set of time ranges consistent with a temporal constraint, and supports bidirectional enumeration of these ranges as well as efficient reasoning about constraint implication and equivalence. When combined with a generic constraint inference mechanism and description of implicit constraints between variables, the representation also enables pragmatic inferences for improved dialogue flow. As an example of equivalence, an automated assistant may prove the following equality between constraints: (Any Wednesday after 1 pm OR Thursday before noon) AND (between Jan. 1, 2017 and Jan. 7, 2017 AND after 2 pm)=Wednesday Jan. 4, 2017 after 2 pm.

In some examples, the OrderedSet representation includes a hierarchy of four types, describing possibly infinite subsets of numbers (e.g., integers, real numbers). The four types include (1) "RangeSet": a single Range with inclusive endpoints; (2) "DisjointRangeUnion": a sorted union of disjoint RangeSets; (3) "PeriodicSet": a repeating sequence of ranges (expressed as a DisjointRangeUnion plus period), bounded to within some Range; and (4) "DisjointRegionUnion": a sorted union of disjoint RangeSets and PeriodicSets.

These representations may be closed under set-based operations such as intersection, union, and negation, all of which can be computed efficiently, and also support constant-time queries for emptiness and minimum and maximum contained value. Equality and subset testing can be implemented efficiently using these operations.

To translate atomic date/time constraints into representations as OrderedSets of integers, a predetermined mapping (e.g., function) f between date/times and integers is defined as follows: # days since arbitrary anchor date*# seconds per day+# seconds since midnight.

While this mapping is similar to the number of seconds since the epoch, it differs in handling of leap seconds and other irregularities, so that the start of each day is always divisible by 86,400 and the start of each week by 604,800. This enables exact, efficient inference about substantially all practical date/time queries (for which leap seconds are intuitively unimportant).

Then, translations into the OrderedSet representation are defined for atomic date/time constraints such as: Before a given date d->a RangeSet (−Infinity, f(d)); After 3 pm->a PeriodicSet with period 86400 and repeated interval (3600*15, 86400); and On a Tuesday->a PeriodicSet with period 604,800 and repeated interval [2*86400, 3*86400), as examples.

More complex constraint expressions can be interpreted by first translating the atomic constraints and then combining the resulting OrderedSets with negation, union (for "or") and/or intersection (for "and"). Equivalence and implication can be proved in this representation, and minimal description expressions can be regenerated directly from the representation as well.

For example, the expression "On any Wednesday and not before 2 pm, or Thursday June 8 before 8 am" can be converted to an ordered set as follows. First, convert the atomic elements: "before 2 pm"→PeriodicSet with period 86400 and repeated interval [0, 14*3600); "any Wednesday" →PeriodicSet with period 604,800 and repeated interval [3*86400, 4*86400); and "Thursday, June 8 before 8 am" →RangeSet [1496880000, 1496880000+8*3600)

Then, combine the elements with logical connectives: NOT "before 2 pm" →PeriodicSet with period 86400 and repeated interval (14*3600, 86400); "any Wednesday" AND NOT "before 2 pm" →first up-convert the PeriodicSets to the least common multiple of their periods, then intersect the repeated intervals to get a PeriodicSet with period 604,800 and repeated interval [3*86400+14*3600, 4*66400); and ("any Wednesday" AND NOT "before 2 pm") OR "Thursday, June 8 before 8 am"→union using De Morgan's law (since intersection may be simpler to implement).

The final result is a DisjointRegionUnion with three components: 1) A PeriodicOrderedSet with bounds (−infinity, 1496275200) and repeated interval [3*86400+14*3600, 4*66400), representing the Wednesdays until May 31; (2) A RangeSet with bounds [1496880000-10*3600, 1496880000+8*3600) representing the contiguous period spanning from Wednesday June 7 at 2 pm to Thursday June 8 at 8 am; and (3) A PeriodicOrderedSet with bounds [1496901600, infinity) and repeated interval [3*86400+ 14*3600, 4*66400) representing the subsequent Wednesdays.

Logical implication can also be implemented with a combination of negation and intersection; for instance, to prove that "On any Wednesday and not before 2 pm, or Thursday June 8 before 8 am" implies "Not on a Friday", a determination may be made that the OrderedSet representing "On any Wednesday and not before 2 pm, or Thursday June 8 before 8 am" AND NOT "Not on a Friday" is empty:

First, Convert "Not on a Friday"->a PeriodicOrderedSet with period 604,800 and repeated intervals [0, 5*86400) and [6*86400, 604,800). Then, compute NOT "Not on a Friday"->a PeriodicOrderedSet with period 604,800 and repeated interval [5*86400, 6*86400). Next, compute "On any Wednesday and not before 2 pm, or Thursday June 8 before 8 am" AND NOT "Not on a Friday" by intersecting the latter ordered set with each of the three components of the former The intersection of the repeated intervals [3*86400+ 14*3600, 4*66400) and [5* 86400, 6*86400) is empty, so the first component is empty. The second component yields a PeriodicOrderedSet with bounds [1496880000-10*3600, 1496880000+8*3600) and repeated interval [5*86400, 6*86400), which can be found to be empty by checking that the iterator of potential RangeSets generated by this PeriodicOrderedSet is empty. The third component is empty by the same computation as the first. Since the overall intersection is empty, the implication is proven to hold. Finally, equivalence can be checked by testing bidirectional implication.

Pragmatic inference in dialogue flow can be provided based on inference in a constraint graph. Operationally, both a user's preferences as well as knowledge about real-world domain constraints can be collected into a uniform constraint graph. Applying general-purpose satisfiability and constraint propagation algorithms to this graph then enable several kinds of pragmatic inference to improve dialogue flow. As an example with respect to constraint propagation and invalidation, a user may say "I want to fly from SFO on January 1 and return January 5", then ask "What if I leave January 7 instead?". An automated assistant may infer that it should not only change the outgoing departure date, but also remove the return date and re-prompt the user "When would you like to return?" With respect to contextual constraint interpretation for intent disambiguation, the automated assistant can say "there is a round trip from SFO to Boston leaving at noon January 1 and arriving at 11 pm, and returning at 9 am on January 3 arriving at 11 pm". If the user says, "can you find something shorter than 20 hours", the automated assistant infers that the user must be referring to total travel time, since both individual legs are shorter than 20 hours already. In contrast, if the user says, "can you find something shorter than 6 hours", the automated assistant infers the user must be referring to a specific leg of the journey (since 6 hours is inconsistent with the feasible range of total travel times).

To perform these inferences, an automated assistant may perform a method of transforming queries (or utterances, intents) for each dialogue domain into constraint graphs, including both constraints explicitly provided by the user as well as implicit constraints that are inherent to the domain. For example, in the flight domain: explicit constraints include user preferences on outgoing and incoming departure and arrival times, as well as constraints on the duration of each leg; and implicit constraints include causal constraints (e.g., departure before arrival, and arrival before return) as well as definitional constraints (e.g., total travel time is outgoing travel time plus returning travel time).

Once all the domain specific constraints have been collected into a graph, general purpose domain-independent algorithms can be used to draw inferences for both intent disambiguation and constraint propagation. Given a candidate interpretation of a user utterance as the posting, modification, or retraction of a constraint, constraint inference techniques such as arc consistency and satisfiability checking can be used to draw pragmatic inferences. For instance, if the constraint change does not affect the set of possibilities consistent with the current graph, it is a sign that this interpretation should be pragmatically dispreferred. Or, if the constraint change makes the graph unsatisfiable, it is also a signal to pragmatically disprefer the interpretation. Moreover, if this interpretation is selected despite the conflict, general-purpose algorithms can be used to identify minimal-cost subsets of other constraints that can be removed to restore consistency.

A related situation arises when, e.g., the user has asked for a non-stop flight under $400 but none exists. Here the constraint graph itself appears a priori satisfiable, but all of the available flights violate one or more user constraints. The same inference algorithm as above can be used to suggest relaxing price or stop constraints to the user.

These features are discussed in more detail through the discussion of FIGS. 4-9 below, which each show a flowchart illustrating a respective example method. The methods illustrated in FIGS. 4-9 may be performed on any suitable device, including but not limited to automated assistant 200 and/or computing system 1100 described below.

Figure 4:
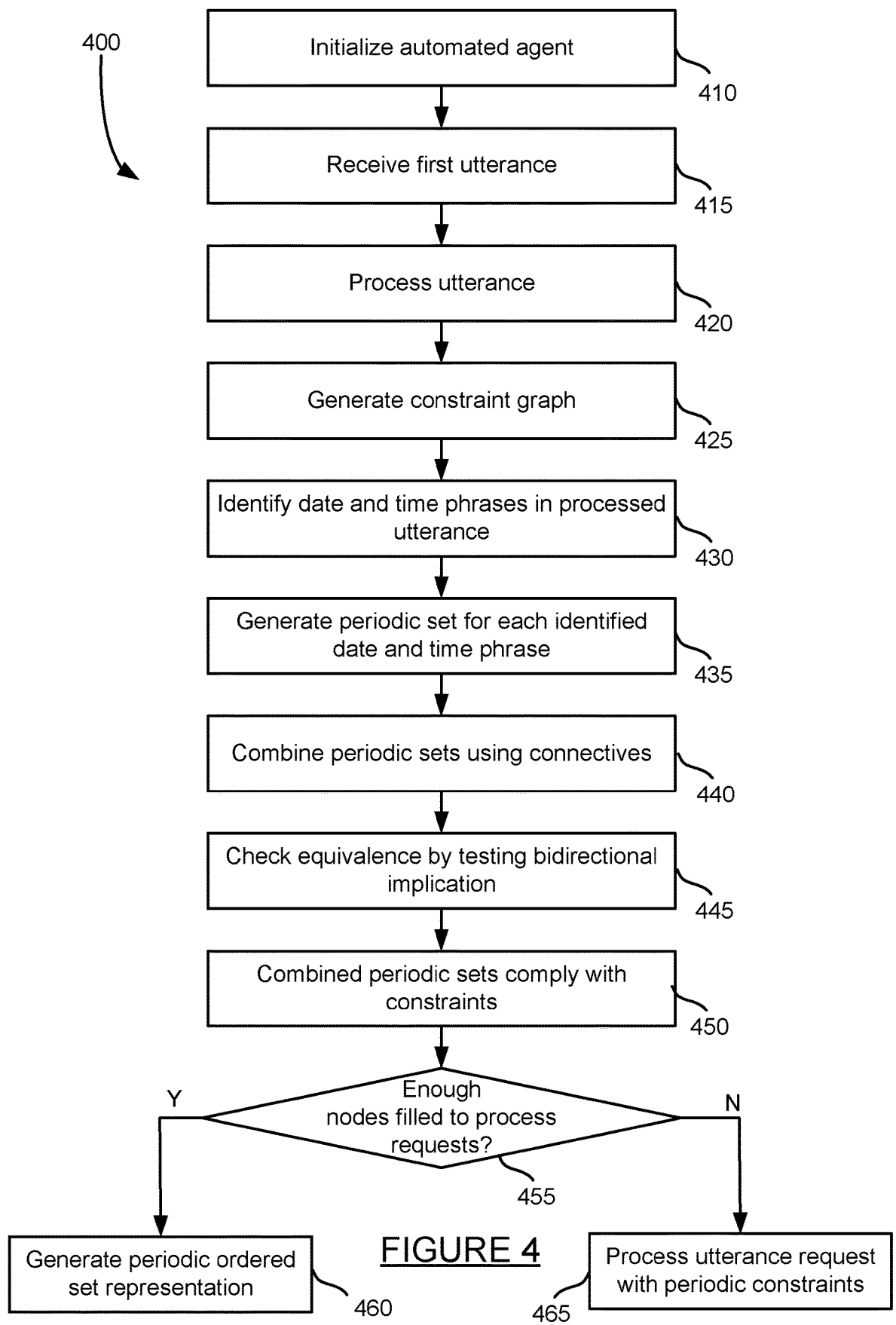
FIG. 4 shows a flowchart illustrating an example method for providing date/time constraints by a dialogue assistant computing system.

FIG. 4 illustrates an example method 400 for providing date/time constraints. First, an automated assistant (e.g., automated assistant 200) is initialized at step 410. A first utterance is received from a user at step 415. The first utterance may be received as audio or other form of input from a user through an input device, such as a microphone integrated in the automated assistant or otherwise communicatively coupled to the automated assistant. The utterance may be part of a dialogue a user is having with the automated assistant.

The utterance is processed at step 420. Processing the utterance may include performing speech recognition on received audio (e.g., via ASR module 210), parsing the speech to identify parts of the utterance (e.g., via parser module 220), and then processing the utterance to detect requests, data, parameters, and other portions of the utterance (e.g., via detection mechanism module 230).

A constraint graph may be generated at step 425 (e.g., via inference module 242). Generating a constraint graph may include generating explicit and implicit constraints, as well as definitional constraints. Generating a constraint graph is discussed in more detail with respect to the method of FIG. 5. In some examples, the constraint graph may be generated based on text derived from a user utterance.

Date/time phrases are identified in the processed utterance at step 430 (e.g., via detection mechanism 230). The date and time phrase data may include names of months, days and times. The dates may be identified exactly, such as May 25, or may be identified more generally, such as "in the afternoon next week."

Periodic sets may be generated for each identified date and time phrase at step 435 (e.g., via date/time constraint module 260). Generating a periodic set may include generating a period, interval, and/or range for a periodic set. More details for generating a periodic set for a date and time phrase are discussed with respect to the method of FIG. 6.

Periodic sets may be combined using connectives at step 440 (e.g., via date/time constraint module 260). The connectives AND and OR can be used to combine periodic sets to precisely define atomic days and times specified in an utterance in periodic set format. Equivalents may then be checked by testing bidirectional application at step 445 (e.g., via date/time constraint module 260).

A confirmation is made that the periodic sets comply with constraints at step 450 (e.g., via date/time constraint module 260). The compliance must exist for inherent and explicit constraints, as well as external constraints. More details for confirming constraint compliance is discussed with respect to the method of FIG. 7.

A determination is made as to whether enough nodes in a constraint graph have been filled to process a user request at step 455 (e.g., via inference module 242). For example, in a constraint graph associated with booking a flight, the nodes of outgoing flight departure time, outgoing flight departure city, outgoing flight arrival time, outgoing flight arrival city, returning flight departure time, returning flight departure city, returning flight arrival time, and returning flight arrival city may be filled. If enough nodes have been filled to complete a request, the utterance request is processed with periodic constraints at step 465. If enough nodes have not been filled, the periodic ordered set representation is generated at step 460. In some examples, a determination may be made that information for at least one node is missing (e.g., via inference module 242). In response to this determination, an action may be executed at the automated assistant based on the missing node. For example, the action may include soliciting additional information from the user (e.g., by outputting a request for the additional information) and/or accessing remote network location(s) for additional information. Generating a periodic ordered set representation is discussed in more detail with respect to the method of FIG. 9.

Figure 5:
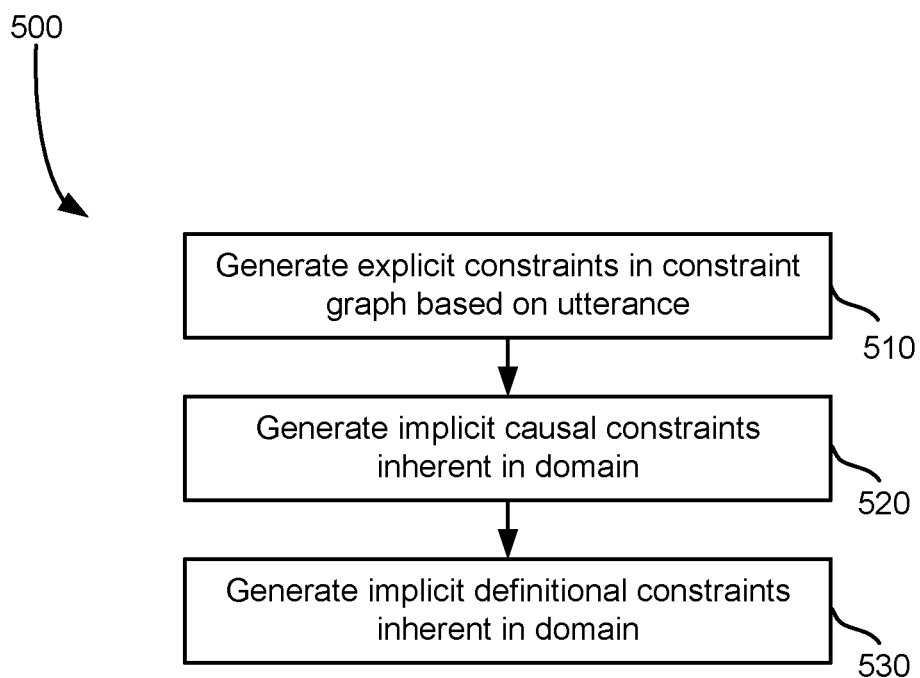
FIG. 5 shows a flowchart illustrating an example method for generating constraint graphs.

FIG. 5 illustrates an example method 500 for generating a constraint graph. The method of FIG. 5 may provide more detail for step 425 the method of FIG. 4, for example. First, explicit constraints are generated in a constraint graph based on the received utterance at step 510. In some examples, the constraint graph may be generated based on one or more phrases in the utterance that relate to dates/times, where the phrase(s) have been detected by processing parsed speech. The parsed speech may be generated by parsing recognized speech, where the recognized speech is recognized from the utterance. The explicit constraints may include details provided by the user, such as in the domain of travel a constraint of a flight departure city, arrival city, day and time of flight, and/or other data. Implicit casual constraints inherent in the domain may be generated at step 520. A casual constraint may include a constraint that a departure must occur before an arrival, and an arrival must occur before a return. Implicit definitional constraints which are inherent in a domain may be generated at step 530. An example of a definitional constraint includes a total travel time defined as the outgoing travel time plus the return travel time. These generated constraints are collectively placed into the constraint graph for the current dialogue. As described below, a computerized automated assistant system may determine an action that satisfies or is otherwise congruent with one or more constraints in the constraint graph. As examples, the action may include purchasing a ticket or booking a hotel room with dates/times that satisfy the date/time constraints in the constraint graph (and potentially satisfy a user request to perform such purchase/booking).

In some examples, the constraint graph may be generated and/or processed according to a graphical model, including but not limited to hidden Markov models, Markov random fields, conditional random fields, and knowledge bases. In such examples, transition functions between nodes in the graph may be computed by a machine learning model such as a neural network or other suitable model. Via the learning model, probabilities of transitioning between different constraints/nodes in the graph may be determined. For example, a user utterance specifying a date of "on Monday" followed by "next week" may lead to a relatively higher probability being learned for transitioning to a date of next Monday, as compared to transitioning to a different date. Transitions between nodes, and traversal of the graph in general, may be preferentially guided according to the transitions that are likeliest, over other less likely transitions.

Figure 6:
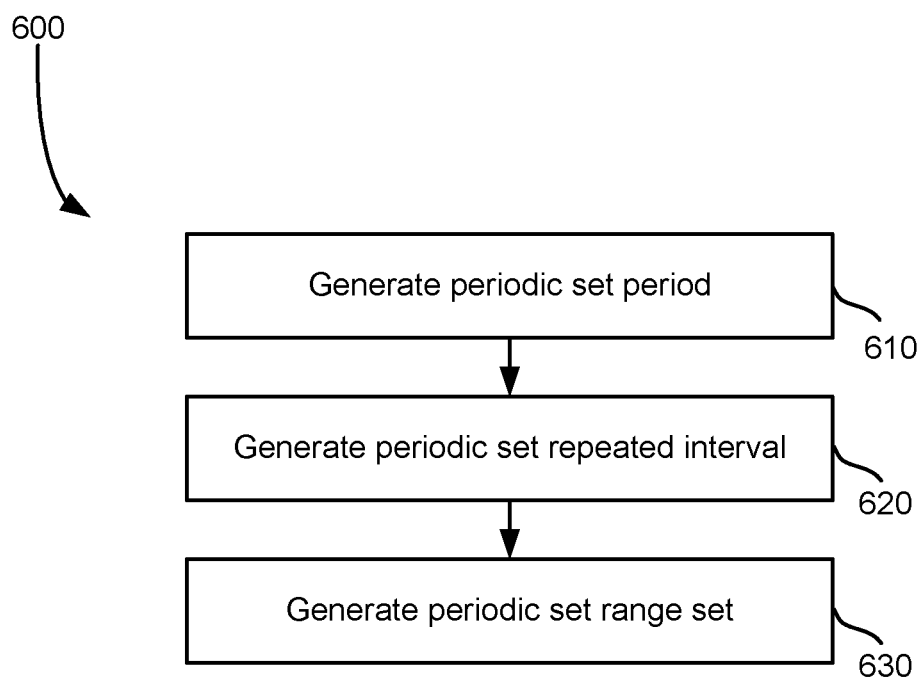
FIG. 6 shows a flowchart illustrating an example method for generating periodic sets for identified date/time phrases.

FIG. 6 illustrates an example method 600 for generating periodic sets for identified date and time phrases. The method of FIG. 6 provides more detail for step 435 the method of FIG. 4. The periodic set can be generated at step 610. A periodic set repeated interval is generated at step 620. A periodic set range set can be generated at step 630.

Figure 7:
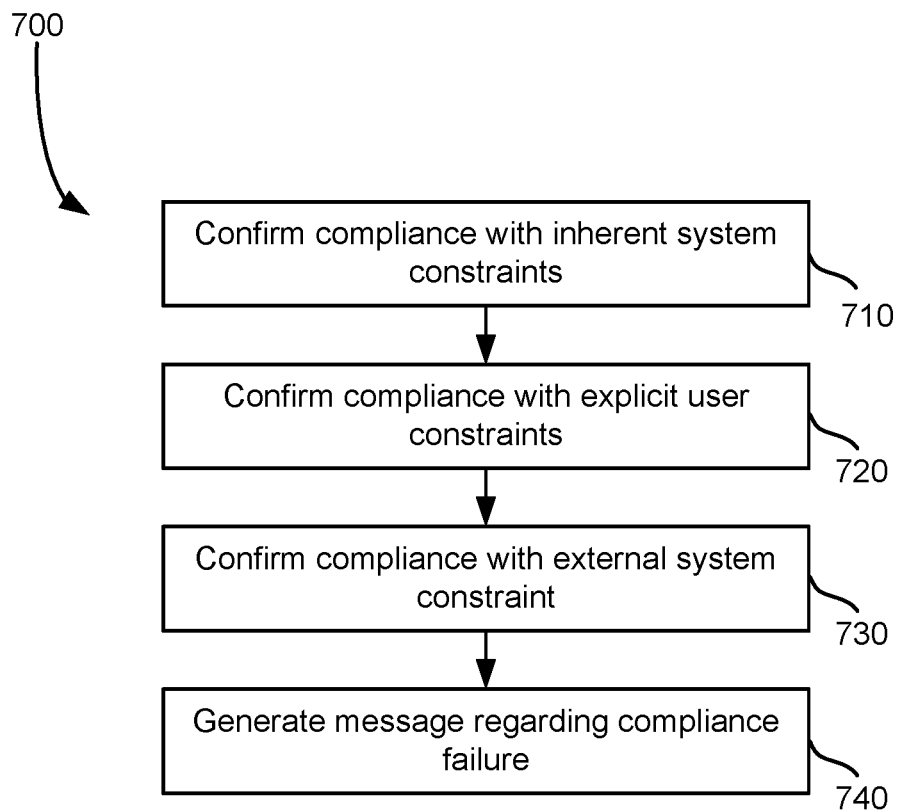
FIG. 7 shows a flowchart illustrating an example method for combining periodic sets that comply with constraints.

FIG. 7 illustrates an example method 700 for combining periodic sets that comply with constraints. The method of FIG. 7 may provide more detail for step 450 of the method of FIG. 4. Compliance with inherent system constraints is confirmed at step 710. In this instance, the effect of the periodic sets is compared to inherent system constraints to determine if any such constraints are violated by the periodic set. Compliance with explicit user constraints is confirmed at step 720. Similarly, the periodic sets are compared with the explicit user constraints to determine if they comply with those constraints. Compliance with external system constraints are then confirmed at step 730. When an utterance resulted in an action that retrieves information from an external system (e.g., a system external to an automated assistant on which step 450 is executed), a determination is made as to whether the external system provides a null set or a set with results. If the external system replies with an empty response set, effectively a null set, then the external system constraint is violated by the user utterance and compliance cannot be confirmed at step 730. A message regarding any compliance failure is generated at step 740 (e.g., via dialogue manager module 240). The message may indicate, for example, "an arrival must occur after a departure."

Figure 8:
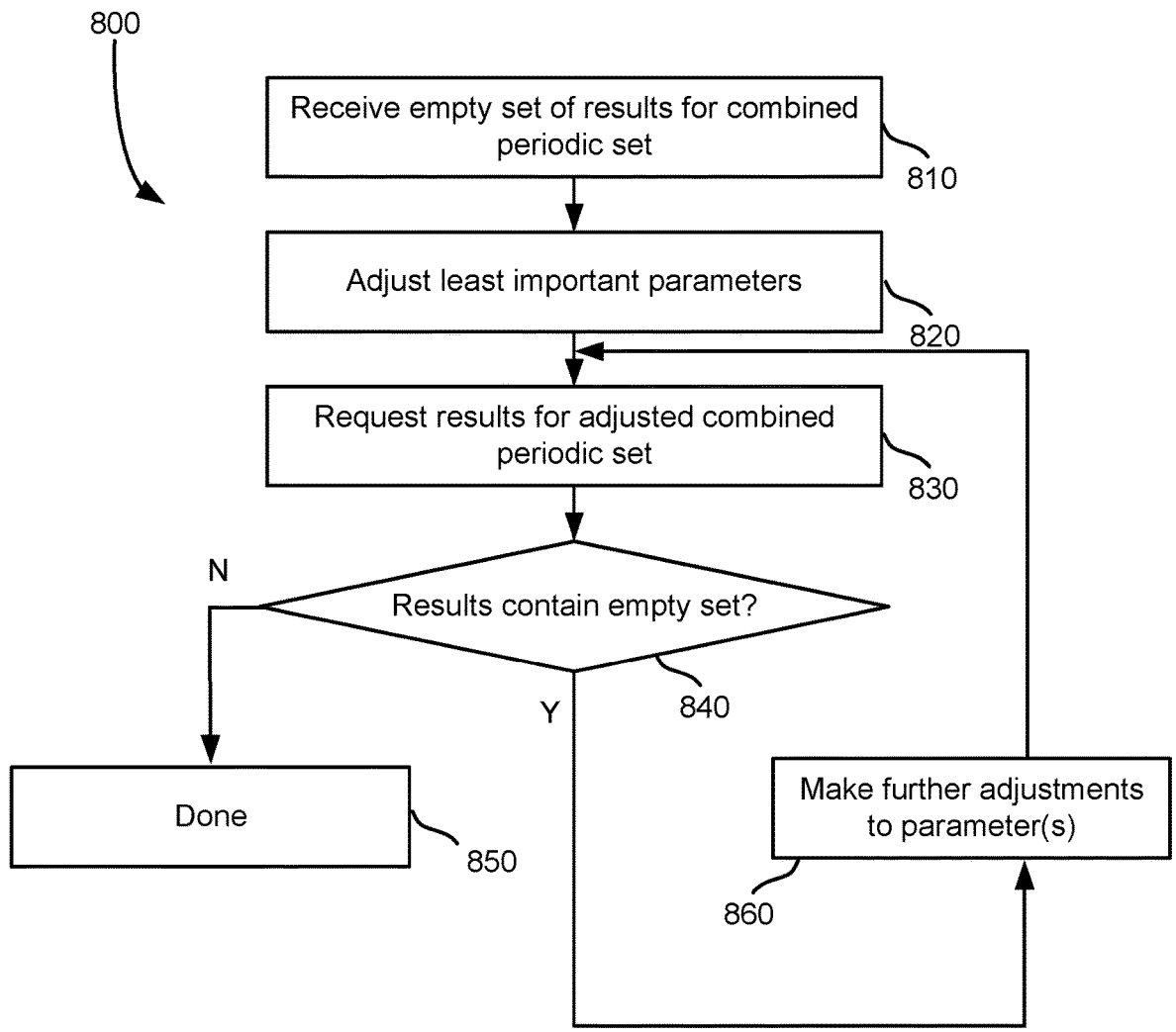
FIG. 8 shows a flowchart illustrating an example method for generating messages regarding compliance failures.

FIG. 8 illustrates an example method 800 that generates messages regarding compliance failures. Method of FIG. 8 may provide more detail for step 740 of the method of FIG. 7. First, empty sets of results are received for combined periodic sets at step 810. A least important parameter may be adjusted at step 820. The parameters may be adjusted in order to attempt to obtain a search result with results that come close to complying with the constraints associated with the present dialogue, including inherent system constraints and explicit user constraints. Results are requested for the adjusted combined periodic set at step 830. A determination is then made as to whether the results received from the request contain an empty set at step 840. If the results do not contain an empty set, then the adjusted parameters resulted in at least one result and the method of FIG. 8 ends at step 850. If the results do contain an empty set, then further adjustments are made to one or more parameters at step 860 and a request is made with the further adjusted parameters at step 830.

Figure 9:
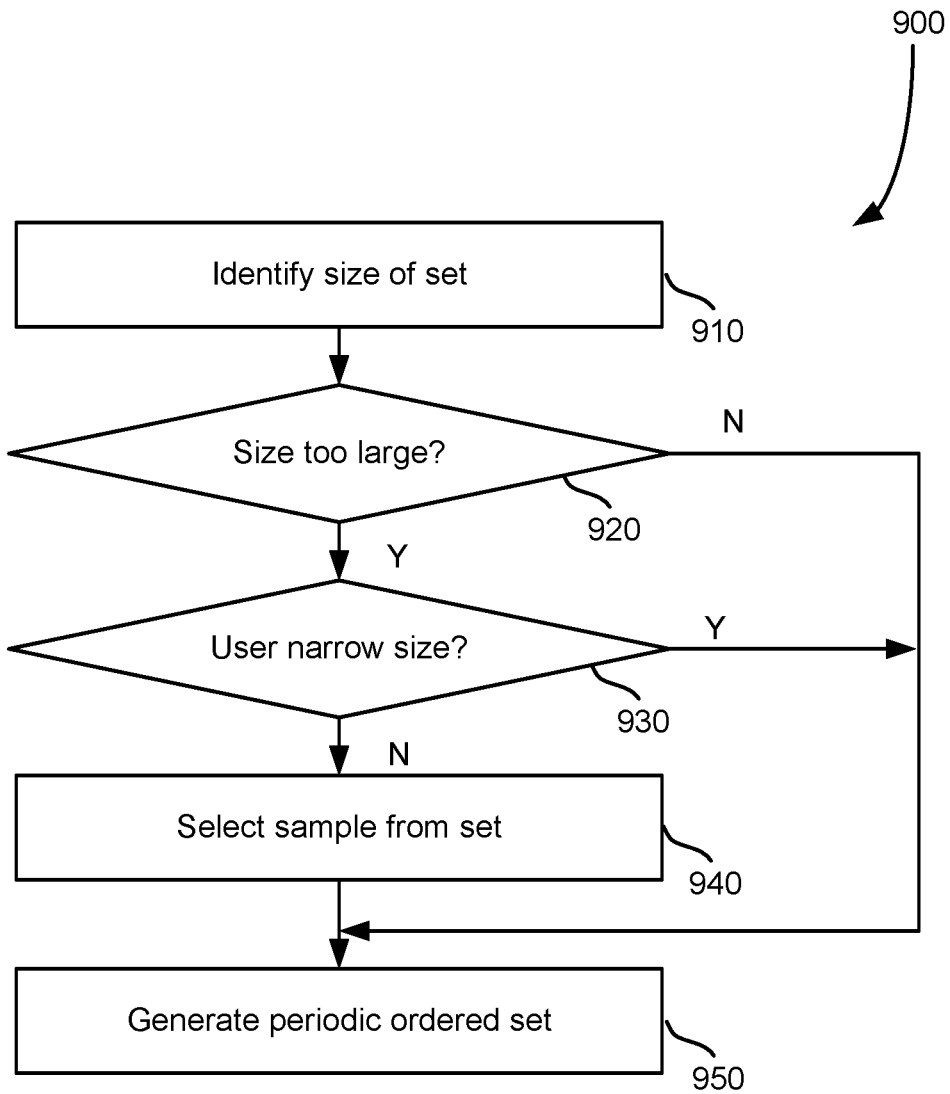
FIG. 9 shows a flowchart illustrating an example method for generating periodic ordered set representations.

FIG. 9 illustrates an example method 900 for generating periodic ordered set representations. The method of FIG. 9 may provide more detail for step 460 of the method of FIG. 4. The size of a set is identified at step 910. A determination is made at step 920 as to whether the size of the set is too large (e.g., above a threshold size). If the size is not too large, the periodic ordered set is generated at step 950. If the size is too large, a user may be queried to narrow the size. If the user responds affirmatively to narrow the set size at step 930, a periodic ordered set is generated for the user narrowed size at step 950. If the size is not narrowed by the user, a sample from the set is selected at step 940 and the periodic ordered set is generated from the sample at step 950.

Figure 10:
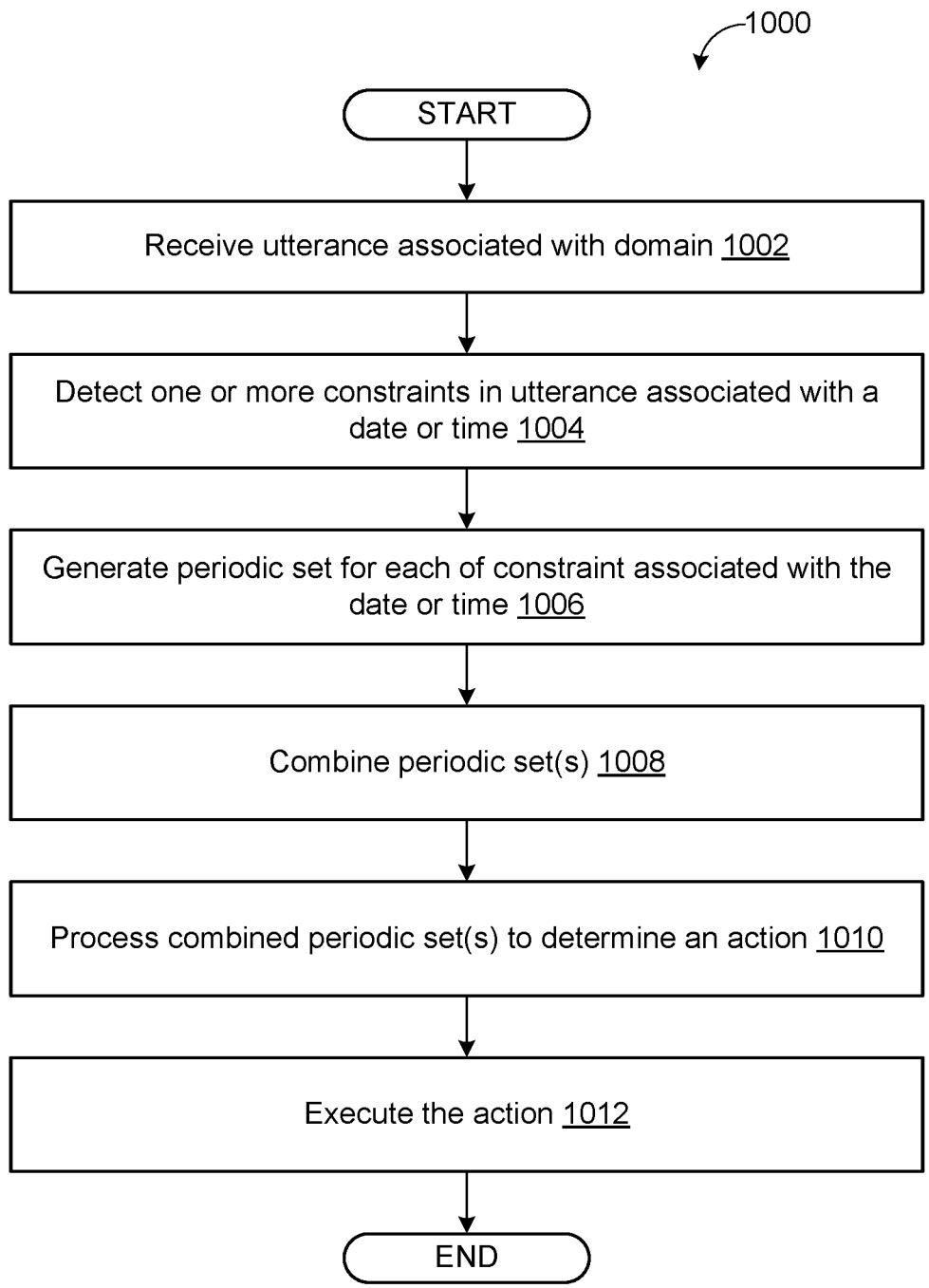
FIG. 10 shows a flowchart illustrating an example method of executing an action.

FIG. 10 shows a flowchart illustrating an example method 1000 of executing an action. Method 1000 may be performed on computerized automated assistant system 100, automated assistant 200 and/or computing system 1100 (described below), for example.

At 1002, method 1000 includes receiving an utterance at a computerized automated assistant system (e.g., system 100, automated assistant 200) including one or more computing machines, the utterance associated with a domain. The domain may relate to the topic of travel, for example. The utterance may also relate to travel—for example, the utterance may include a request to establish itinerary for a trip, to purchase a ticket for a flight or another medium of travel. The utterance may include a specification of date/time constraints of various levels of granularity. For example, the utterance may generally state the desire to travel: "I'd like a trip to Japan this month." As further examples, the utterance may state specific dates/times: "I'd like to depart between January 1 and January 8, and I'd like to return home between January 20 and January 25."

At 1004, method 1000 includes detecting one or more constraints in the utterance associated with a date/time. The constraint(s) may be detected via a date/time constraint module (e.g., module 260) of the computerized automated assistant system (e.g., based on text translated from the utterance). Alternatively or additionally, a previously-trained NLP module may detect one or more phrases (e.g., in parsed speech) that related to the date/time. As described above, such constraint(s) may include a year, month, day, time, ranges thereof, etc.

In some examples, detecting the constraint(s) may include recognizing, via a machine-learning trained speech recognition module (e.g., ASR module 210), speech in the utterance. In some examples, detecting the constraint(s) may include parsing the recognized speech, via a previously-trained natural language processing (NLP) module, to determine an intent of the utterance. The intent may be a desired action or outcome—an intent to purchase a ticket, book a flight or hotel room, etc. In some examples, the intent may be a topic or subject relating to the utterance. In some examples, the recognized speech may be parsed to determine that the intent of the utterance relates to the domain (e.g., the topic/subject of travel). In some examples, the recognized speech may be parsed to determine one or more entities mentioned in the utterance. In some examples, detecting the constraint(s) may include generating, via an inference module (e.g., inference module 242) of the computerized automated assistant system, a constraint graph (e.g., constraint graph 262) by transforming the intent (or in other examples, transforming words/phrases) into the constraint graph, where the constraint graph may include one or more explicit constraints specified in the utterance (e.g., specific dates/times, ranges thereof) and/or one or more implicit constraints inherent to the domain (e.g., arrival time occurs after departure time). In some examples, detecting the constraint(s) may include matching, via a CSP solver module and/or other suitable mechanism, an entity of the one or more entities with a constraint in the constraint graph. In some examples, an "entity" may be a constraint in the utterance (e.g., date/time, range thereof), while in other examples an entity may be considered a word, phrase, and/or lexeme.

To illustrate the generation of the constraint graph and matching of entities to constraints in the graph, a non-limiting example of both follows. In this example, an utterance has been parsed to determine an associated intent of attempting to book a flight. It is known from the corresponding domain (e.g., travel) that a date for which to book the flight is needed to perform the action of booking the flight. A constraint graph may then be generated with constraints (e.g., implicit, explicit) associated with the intent—constraints associated with details used to fulfill the intent and perform the action. Such constraints may include an arrival location of Boston, while other constraints may be yet undetermined such as the departure date. Thus, an entity derived from the utterance is sought that can be used to fill the unknown departure date constraint. The entities may be examined to identify an entity with a type (e.g. of date/time) that corresponds to a type of the unknown departure date constraint. Since the types match, the constraint is filled with the matching entity (e.g., next week). In this example, entity-constraint matches are identified by matching entities and constraints of the same or generally matching type, where pre-defined types are associated with entities and constraints.

At 1006, method 1000 includes generating a periodic set for each of the one or more constraints associated with the date or time. The periodic set(s) may be generated via the date/time constraint module. A periodic set may include a period and repeated interval, for example.

At 1008, method 1000 includes combining the one or more periodic sets. The periodic set(s) may be combined via the date/time constraint module. A periodic set may be combined via union, intersection, and/or negation, for example.

At 1010, method 1000 includes processing the combined periodic set(s) to determine an action. The combined periodic set(s) may be processed via a dialogue manager module (e.g., module 240) of the computerized automated assistant system. As examples, the action may include looking up booking information for flights, tickets, hotels, etc. As further examples, the action may include purchasing a ticket, booking a trip, securing a hotel room, renting a car or other items, etc. As such, the action may include accessing, via a network, remote network locations (e.g., for relevant data provided by a remote computing system) and/or remote devices.

Determining the action may include assessing various constraints specified by or otherwise derived from a user utterance, as described above. User-specified constraints may be determined from a user utterance that has undergone various forms of processing (e.g., speech recognition, parsing). Such constraints may relate to a date and/or time, such as a date of arrival, a date of departure, etc. Other constraints may be assessed, including logical constraints (e.g., date of arrival is later than date of departure). Further, additional properties specified in a user utterance may be evaluated, such as a type of request (e.g., to purchase a ticket, book a hotel room, rent equipment). A determined action may be congruent with one or more of these constraints/properties (and/or the combined periodic sets representing the constraints properties). For example, a user request to purchase a ticket with a departure date of January 1 may lead to determining an action in the form of finding an electronic ticket with the same departure date, and outputting an indication of the electronic ticket—e.g., a audio reply asking the user to approve purchase of the ticket. As described above, in some examples constraints may be represented and traversed in a constraint graph.

In some examples, such constraints and/or properties, as well as external information (e.g., available flights, hotel rooms, rentals) may be provided as an input vector or other data structure to a machine learning module trained to output an action. For example, the machine learning module may evaluate various actions (e.g., book flight for specific date, book flight for range of days, book hotel room for specific date, book hotel for range of days) and determine a confidence level for each action. The confidence level may be determined based on parameters learned via supervised training using labeled data and/or reinforcement training, for example, or through any other suitable training process. In some examples, the previously-trained machine learning module may process combined set(s) to determined and/or execute an action.

In some examples, an action may include or otherwise be associated with two or more actions. For example, the computerized automated assistant system may attempt to service both a user request to purchase a ticket and a user request to book a hotel room. In such examples, the system may use a recurrent neural network, long-short-term memory (LS™), or other suitable mechanism to track prior actions in order to assess subsequent actions based on constraints/properties as well as the prior actions. As a particular example, the system may be trained to determine a confidence that booking a hotel is the most likely correct action, given that a user uttered "book my trip next week" and that the system has already booked a flight.

In some examples, a machine learning module used to determine actions may be trained via supervision, in which certain actions are designated as correct (e.g., decisions made by a human travel agent when booking flights based on user criteria, and/or historical data of users booking flights, labelled to indicate user satisfaction). Alternatively or additionally, training may utilize reinforcement learning: for each set of details, a decision is made, and a user gives feedback indicating whether the decision is satisfactory or not; then the system is trained based on the feedback, for example. In some examples, the machine learning module may be implemented in dialogue manager module 240, while in other examples the machine learning module may be implemented as a separate module. Any suitable machine learning-based mechanism or any other suitable mechanism may be used to determine and/or execute an action, however.

At 1012, method 1000 includes executing the action at the computerized automated assistant system. Executing the action may include outputting, to an output device (e.g., display device, speaker), an indication of the execution of the action. For example, a display device may indicate that a ticket was successfully purchased in accordance with the date/time constraints specified in the user utterance received at 1002. Other examples of executing the action may include soliciting additional information from the user, and accessing via a network remote network locations for information.

While the approaches described herein relate to the context of travel and to date/time constraints, it will be understood that the disclosed approaches are not limited to this context or constraint type. Instead, the disclosed approaches may apply to any suitable context or constraint type, including but not limited to financial transactions, medical care, appointment/meeting scheduling, and historical/educational/didactic contexts.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 11:
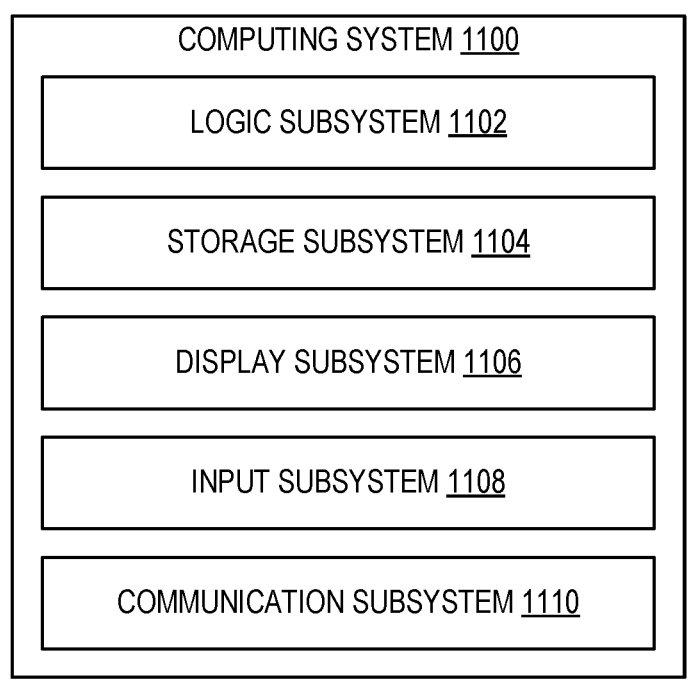
FIG. 11 is a block diagram of an example computing system.

FIG. 11 schematically shows a simplified representation of a computing system 1100 configured to provide any to all of the compute functionality described herein. Computing system 1100 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices or combinations thereof. As one example, computing system 1100 may implement at least a portion of automated assistant 200 or system 100.

Computing system 1100 includes a logic subsystem 1102 and a storage subsystem 1104. Computing system 1100 may optionally include a display subsystem 1106, input subsystem 1108, communication subsystem 1110, and/or other subsystems not shown in FIG. 11.

Logic subsystem 1102 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1104 includes one or more physical devices configured to temporarily and/or permanently hold computer information such as data and instructions executable by the logic subsystem. When the storage subsystem includes two or more devices, the devices may be collocated and/or remotely located. Storage subsystem 1104 may include volatile, nonvolatile, dynamic, static, read/write, read-only, random-access, sequential-access, location-addressable, file-addressable, and/or content-addressable devices. Storage subsystem 1104 may include removable and/or built-in devices. When the logic subsystem executes instructions, the state of storage subsystem 1104 may be transformed—e.g., to hold different data.

Aspects of logic subsystem 1102 and storage subsystem 1104 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to hardware and any software, instructions, modules, and/or other components cooperating with such hardware to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application or module) cooperating with a remote component (e.g., cloud computing service). The software and/or other instructions that give a particular machine its functionality are referred to as modules.

Modules and machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more modules and/or machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., Markov models, Markov random fields, (hidden) conditional random fields, and/or AI knowledge bases), and/or natural language processing techniques (e.g., tokenization, stemming, constituency and/or dependency parsing, and/or intent recognition, segmental models, super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

When included, display subsystem 1106 may be used to present a visual representation of data held by storage subsystem 1104. This visual representation may take the form of a graphical user interface (GUI). Display subsystem 1106 may include one or more display devices utilizing virtually any type of technology. In some implementations, display subsystem may include one or more virtual-, augmented-, or mixed reality displays.

When included, input subsystem 1108 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1110 may be configured to communicatively couple computing system 1100 with one or more other computing devices. Communication subsystem 1110 may include wired and/or wireless communication devices compatible with one or more different communication protocols. The communication subsystem may be configured for communication via personal-, local- and/or wide-area networks.

Another example provides a method comprising receiving an utterance at a computerized automated assistant system including one or more computing machines, the utterance associated with a domain, detecting, via a date/time constraint module of the computerized automated assistant system, one or more constraints in the utterance associated with a date or time, generating, via the date/time constraint module, a periodic set for each of the one or more constraints associated with the date or time, combining, via the date/time constraint module, the one or more periodic sets, processing, via a dialogue manager module of the computerized automated assistant system, the combined periodic sets to determine an action, and executing the action at the computerized automated assistant system. In such an example, detecting the one or more constraints in the utterance may alternatively or additionally include recognizing, via a machine-learning trained speech recognition module, speech in the utterance, parsing the recognized speech, via a previously-trained natural language processing module, to determine that an intent of the utterance relates to the domain, and to determine one or more entities in the utterance, transforming, via an inference module of the computerized automated assistant system, the intent into a constraint graph, the constraint graph including an explicit constraint specified in the utterance, and matching, via a constraint satisfaction problem solver module, an entity of the one or more entities with a constraint in the constraint graph. In such an example, generating the periodic set for each of the one or more constraints alternatively or additionally may include deriving one or more atomic elements from the utterance and translating the one or more atomic elements into corresponding integers via a predetermined mapping. In such an example, processing the combined periodic sets to determine the action alternatively or additionally may include utilizing a previously-trained machine learning module to determine the action that is congruent with the combined periodic sets. In such an example, the date/time constraint module may be configured to combine the one or more periodic sets via one or both of a union function and an intersection function. In such an example, each periodic set may include a period and a repeated interval. In such an example, executing the action may include retrieving, via the computerized automated assistant system, information associated with the one or more constraints. In such an example, the method alternatively or additionally may comprise constructing, via an inference module of the computerized automated assistant system, a constraint graph based at least in part on the utterance, the constraint graph having one or more nodes, determining, via the inference module, that information for at least one node is missing, and executing an additional action based on the missing node at the computerized automated assistant system. In such an example, the date/time constraint module alternatively or additionally may be configured to generate the constraint graph from one or more implicit constraints associated with the domain. In such an example, executing the additional action may include requesting a result, and the method alternatively or additionally may comprise comparing the result to an external result constraint.

Another example provides a storage subsystem holding instructions executable by a logic subsystem of a computerized automated assistant system, the instructions comprising instructions to receive an utterance associated with a domain, instructions to recognize, via a machine-learning trained speech recognition module, speech in the utterance, instructions to parse, via a previously-trained natural language processing module, the recognized speech, instructions to detect, via the previously-trained natural language processing module, one or more phrases in the parsed speech that relate to a date or time, instructions to transform, via an inference module, the one or more detected phrases into a constraint graph including one or more constraints associated with the date or time, instructions to generate a periodic set for each of the one or more constraints by determining, for that constraint, a period and a repeated interval, instructions to combine the one or more periodic sets, instructions to process, via a previously-trained machine learning module, the combined periodic sets to determine an action, and instructions to execute the action. In such an example, the instructions to combine the one or more periodic sets may include instructions to combine the one or more periodic sets via one or both of a union function and an intersection function. In such an example, the instructions to execute the action may include instructions to output, to an output device, an indication of the execution of the action. In such an example, the instructions to execute the action alternatively or additionally may include instructions to retrieve, via the computerized automated assistant system, information associated with the one or more constraints. In such an example, the instructions alternatively or additionally may comprise instructions to determine, via the inference module, that information for at least one node in the constraint graph is missing, and instructions to execute an action based on the missing node at the computerized automated assistant system. In such an example, the constraint graph alternatively or additionally may include one or more implicit constraints associated with a domain corresponding to the utterance. In such an example, the instructions to execute the action alternatively or additionally may include instructions to request a result, the storage subsystem further comprising instructions to compare the result to an external result constraint.

Another example provides a computing system comprising a microphone configured to record human speech, a speech recognition machine configured to translate the recorded human speech to text, a date/time constraint machine configured to detect in the text one or more constraints associated with a date or time, the date/time constraint machine further configured to generate a periodic set for each of the one or more constraints associated with the date or time, the date/time constraint machine further configured to combine the one or more periodic sets, a dialogue manager machine configured to process the combined periodic sets to determine an action, and one or more machines configured to execute the action. In such an example, the computing system alternatively or additionally may comprise an inference machine configured to construct a constraint graph based at least in part on the text, the constraint graph having one or more nodes, and the inference module further configured to determine that information for at least one node is missing, wherein the one or more machines are configured to execute an action based on the missing node. In such an example, the constraint graph alternatively or additionally may include one or more implicit constraints associated with a domain associated with the text.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:
1. A method, comprising:
receiving an input at a computing system including one or more computing machines;
detecting, via a date/time constraint module of the computing system, two or more constraints in the input associated with a date or time;
for each of the two or more constraints associated with the date or time:
extracting atomic temporal elements from the constraint; and
generating, via the date/time constraint module, a periodic set for the constraint by converting the extracted atomic temporal elements to one or more periodically repeating time intervals represented by a com- mon unit of time, wherein the generated periodic set for each of the two or more constraints uses the same common unit of time;

combining, via the date/time constraint module, each of the generated periodic sets via one or more connective functions;

processing, via a manager module of the computing system, the combined periodic sets to determine an action; and executing the action at the computing system.

2. The method of claim 1, wherein the two or more constraints include a first temporal constraint and a second temporal constraint that is semantically different from the first temporal constraint, the method further comprising determining that the first temporal constraint is mathematically equivalent to the second temporal constraint.

3. The method of claim 1, further comprising determining that the combined periodic sets comply with the two or more constraints.

4. The method of claim 1, wherein generating the two or more periodic sets includes, for each generated periodic set, generating one or more of a period, an interval, and a range.

5. The method of claim 1, further comprising generating, for each of the two or more constraints associated with the date or time, one or more of a range set including a range having inclusive endpoints, a disjoint range union including a union of one or more disjoint range sets, and a disjoint region union including a union of one or more disjoint range sets and one or more periodic sets.

6. The method of claim 1, wherein the extracted atomic temporal elements from each of the two or more constraints are mapped to the one or more periodically repeating time intervals via a function that includes an input of a number of days, an input of a number of seconds per day, and an input of a number of seconds since midnight.

7. The method of claim 1, further comprising constructing a constraint graph based at least in part on the input.

8. The method of claim 7, wherein the constraint graph is constructed based on a user preference and a constraint corresponding to a domain associated with the input.

9. The method of claim 7, wherein determining the action includes determining that the action satisfies one or more constraints in the constraint graph.

10. The method of claim 1, further comprising providing the two or more constraints to a machine learning module trained to determine a confidence level for the action.

11. The method of claim 1, wherein the two or more constraints relate to an itinerary for travel, and wherein the action includes finding a flight based on the two or more constraints and outputting, via an output device, information regarding the flight.

12. The method of claim 1, further comprising generating, via a text-to-speech module, speech based on the action, and outputting, via one or more audio output devices, the speech.

13. A computing system, comprising:
an input subsystem;
a logic subsystem; and
a storage subsystem comprising instructions executable by the logic subsystem to:
receive, via the input subsystem, an input;
detect two or more constraints in the input associated with a date or time;
for each of the two or more constraints associated with the date or time:
extract atomic temporal elements from the constraint; and
generate a periodic set for the constraint by converting the extracted atomic temporal elements to one or more periodically repeating time intervals represented by a common unit of time, wherein the generated periodic set for each of the two or more constraints uses the same common unit of time;
combine each of the generated periodic sets via one or more connective functions;
process the combined periodic sets to determine an action; and
execute the action at the computing system.

14. The computing system of claim 13, wherein the two or more constraints include a first temporal constraint and a second temporal constraint that is semantically different from the first temporal constraint, further comprising instructions executable to determine that the first temporal constraint is mathematically equivalent to the second temporal constraint.

15. The computing system of claim 13, further comprising instructions executable to determine that the combined periodic sets comply with the two or more constraints.

16. The computing system of claim 13, wherein the instructions executable to generate the two or more periodic sets are executable to, for each generated periodic set, generate one or more of a period, an interval, and a range.

17. The computing system of claim 13, wherein the extracted atomic temporal elements from each of the two or more constraints are mapped to the one or more periodically repeating time intervals via a function that includes an input of a number of days, an input of a number of seconds per day, and an input of a number of seconds since midnight.

18. The computing system of claim 13, further comprising instructions executable to construct a constraint graph based at least in part on the input.

19. A method, comprising:
receiving an input at a computing system including one or more computing machines;
detecting, via a date/time constraint module of the computing system, two or more temporal constraints in the input associated with a date or time;
for each of the two or more temporal constraints associated with the date or time:
extracting atomic temporal elements from the temporal constraint; and
generating, via the date/time constraint module, a periodic set for the temporal constraint by converting, via a predetermined function, the extracted atomic temporal elements to one or more periodically repeating time intervals represented by a common unit of time, wherein the generated periodic set for each of the one or more constraints uses the same common unit of time;
combining, via the date/time constraint module, each of the generated periodic sets via one or more connective functions;
processing, via a manager module of the computing system, the combined periodic sets to determine an action that satisfies the one or more temporal constraints; and
executing the action at the computing system.

20. The method of claim 19, wherein the two or more temporal constraints include a first temporal constraint and a second temporal constraint that is semantically different from the first temporal constraint, the method further comprising determining that the first temporal constraint is mathematically equivalent to the second temporal constraint.

* * * * *